United States Patent

[11] 3,594,644

| | | |
|---|---|---|
| [72] | Inventors | Harold A. List;<br>Charles C. Pullen; Richard S. Hostetter, Jr., all of Bethlehem, Pa. |
| [21] | Appl. No. | 721,651 |
| [22] | Filed | Apr. 16, 1968 |
| [45] | Patented | July 20, 1971 |
| [73] | Assignee | Bethlehem Steel Corporation |

[54] ELAPSED TIME REGISTERING APPARATUS WITH LEVEL DETECTORS
9 Claims, 2 Drawing Figs.

[52] U.S. Cl. .................................................. 324/181,
72/16, 324/103
[51] Int. Cl. ..................................................... G04f 9/00,
G01r 19/16
[50] Field of Search ................................................ 324/68, 68
A, 68 B, 68 C, 68 ET, 103 P; 235/92-29 T, 151-11,
92; 72/8, 16

[56] References Cited
UNITED STATES PATENTS

| 2,630,171 | 3/1953 | Allgaier | 324/68 (B) UX |
| 3,259,746 | 7/1966 | Blunt | 235/92 (29 T) |
| 2,774,535 | 12/1956 | Anderson | 324/103 (P) |

Primary Examiner—Alfred E. Smith
Attorney—James J. O'Keefe

ABSTRACT: A variable process signal is fed to several level detectors which send individual time variable signals to a control unit for the duration the variable process signal is maintained within each of several specified limits. Corelated time variable operating mode signals are also fed to the control unit. The control unit classifies each level of variable process signal according to duration under one or more operating modes. Individual time meters register the elapsed time of each classified signal, thereby providing performance data on apparatus associated with the process signal. Means are provided for calibrating the level detectors and for counting apparatus operations.

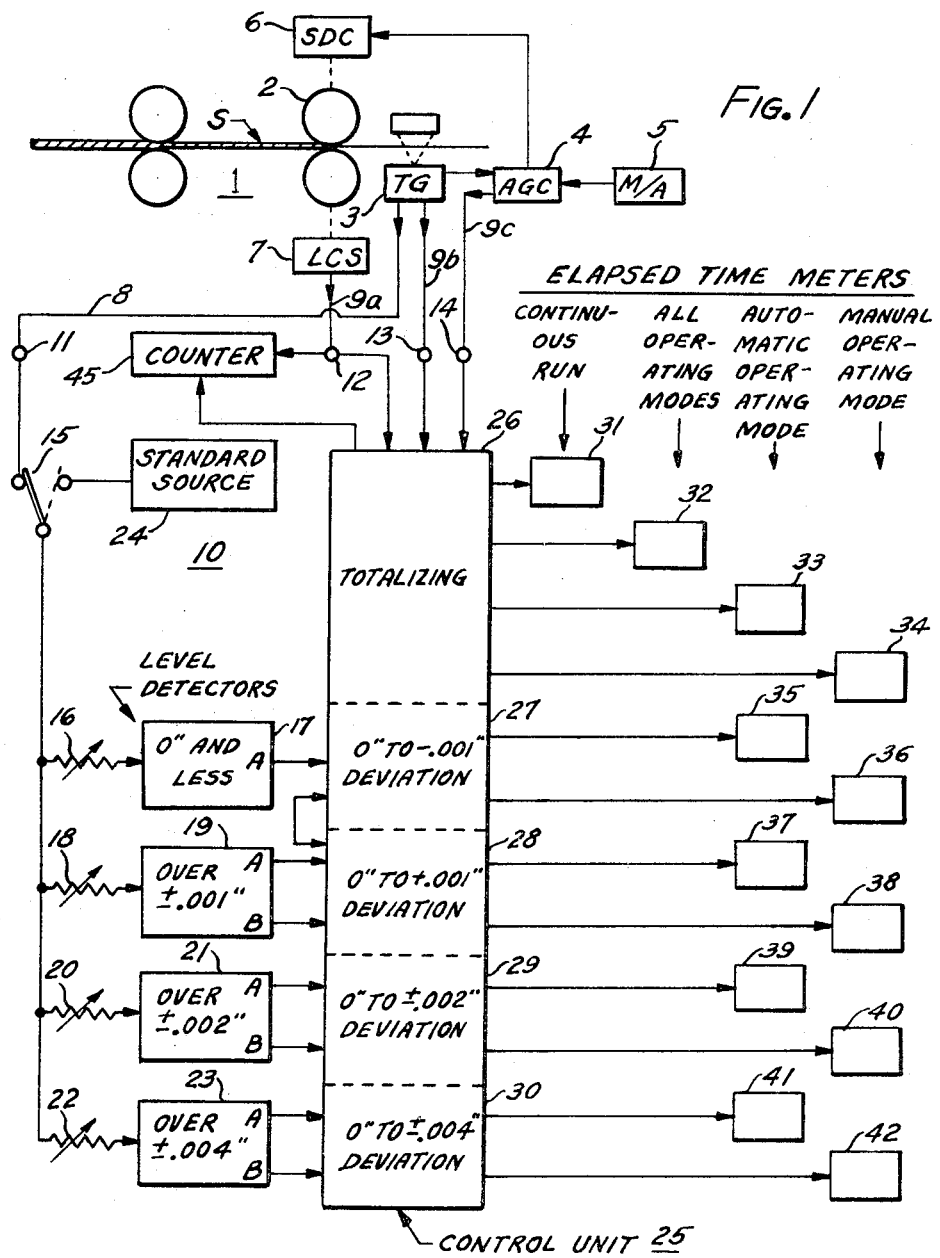
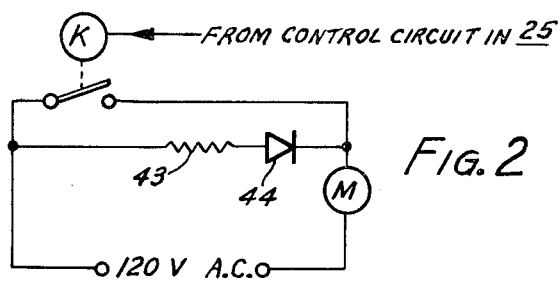

ELAPSED TIME REGISTERING APPARATUS WITH LEVEL DETECTORS

BACKGROUND OF THE INVENTION

This invention relates broadly to apparatus for registering elapsed time. More specifically, this invention related to apparatus for registering the elapsed time a measured variable is maintained within a number of specified limits in relation to the duration of one or more operating modes of apparatus associated with said variable.

Although broadly applicable to numerous measured variables such as voltage, current, temperature, pressure, flow, thickness, etc., the present invention has been applied to an automated metal strip rolling mill in which the duration of thickness deviation and operating mode signals are registered to obtain mill gaging performance data on a long term basis. Hence, the invention will be described in this connection for purposes of illustration only.

In automated high-speed metal strip rolling mills a thickness gage normally detects deviations in strip thickness from a desired value and sends an error signal during such occurrences to screwdown apparatus to make appropriate corrections in roll spacing. At times, a significant quantity of off-gage strip is rolled before suitable corrective measures become effective. This may occur at any time during either automatic or manual operating modes. In addition, it may be attributed to one or more operating disturbances such as are caused by malfunctioning automatic gage controls, defective rolls, changes in operating crews, and uncoordinated changes in mill pace or other operating practices.

In the past, rolling mill performance was judged in terms of off-gage tonnage. Generally, no coordinated time information was accumulated with respect to the duration of various thickness deviations in relation to different operating modes and to the counting of mill operations. These factors are essential in high-speed mills for evaluating overall mill performance, thickness gage performance, and characteristics of numerous automatic control systems incorporated in the mill. Due to the unavailability of suitable elapsed time registering apparatus, resort was made to analyzing recorded thickness deviation signals to obtain the aforesaid time information. This was done with complex equipment and at great expense, but did not prove entirely satisfactory.

SUMMARY OF THE INVENTION

One object of this invention is to provide improved apparatus for registering the elapsed time a measured variable is maintained within a number of specific limits in relation to the duration of one or more operating modes of apparatus associated with said variable.

Another object of this invention is to provide said improved apparatus for operation over long periods of time.

Still another object of this invention is to provide improved apparatus for registering said elapsed time in conjunction with a count of said associated apparatus operations.

Yet another object of this invention is to provide relatively simple and inexpensive apparatus for registering said elapsed time.

Other and further objects of this invention will become apparent during the course of the following description and by reference to the accompanying drawing and the appended claims.

We have discovered that the foregoing objects can be attained by feeding an amplitude variable process signal, such as a thickness gage deviation signal, to several level detectors which are preset for different specified limits of deviation. The detectors send individual time variable process signals to a control unit for the duration the variable process signal is maintained within each specified limit. Correlated time variable operating mode signals are also fed to the control unit. The control unit classifies each level of process signal deviation according to duration under one or more process operating modes and also classifies the duration of individual and combined operating mode signals. Individual time meters register the elapsed time of each classified signal, thereby providing performance data on the thickness gage.

DESCRIPTION OF THE DRAWINGS

FIG. 1 is a diagrammatic representation of the elapsed time registering apparatus of the present invention as applied to an automated metal strip rolling mill.

FIG. 2 is a schematic diagram of a time meter improvement used in the present invention.

DESCRIPTION OF THE PREFERRED EMBODIMENT

In FIG. 1 there is shown the final finishing stand portion of an automated high-speed metal strip rolling mill 1 in which rolls 2 continuously work moving strip S to its final thickness. Thickness gage 3 determines actual strip S thickness and sends an amplitude variable thickness deviation signal to automatic gage controller 4 whenever strip S thickness differs from a desired value. Automatic gage controller 4, which is also under control of manual-automatic operating mode selector 5, signals screwdown controller 6 to adjust a preset spacing between rolls 2 whenever a thickness deviation signal exists.

Mill 1 produces an amplitude variable process signal 8 from gage meter 3 which represents negative and positive thickness deviation of strip S from a desired value. Mill 1 also produces three time variable output signals, or pulses, 9a, 9b and 9c representing different operating modes and functions thereof. Output signal 9a is provided by load cell switch 7 when strip S is in the last finishing stand. Output signal 9b is supplied by thickness gage 3 when it determines that output signal 8 is valid during production runs and is nonexistent when thickness gage 3 is inoperative. Output signal 9c is supplied by automatic gage controller 4 during automatic operating mode. Its absence signifies a manual operating mode.

Elapsed time registering apparatus 10 includes four input terminals 11, 12, 13, 14 for receiving mill output signals 8, 9a, 9b, 9c, respectively. Thickness deviation signal 8 is fed from input terminal 11 via operate-calibrate selector switch 15, through adjustable resistors 16, 18, 20, 22, and then into level detectors 17, 19, 21, 23, respectively.

Resistors 16, 18, 20, 22 are adjusted to different values to correspond to different amplitude variable deviation limits. In the present case, adjustments are made to establish thickness deviation signal limits at the equivalent of 0 inches and less, over ±0.001 inch, over ±0.002 inch, and over ±0.004 inch, for respective level detectors 17, 19, 21, 23.

Each level detector 17, 19, 21, 23 contains conventional detecting and amplifying circuitry. Each produces A and B time variable output signals, or pulses, which are responsive to negative and positive thickness deviation signals as applied through their associated resistors 16, 18, 20, 22 with respect to a neutral reference source. Each output signal is present for the duration the negative or positive deviation signal is maintained within the aforesaid limit designated for each detector.

Each level detector also includes a neutral reference source which is adjusted to the equivalent of 0 inches thickness deviation. A device meeting the description of said level detectors is supplied by Control Data Corporation, La Jolla, California, their "Magsense" Model 077 with dual set points. It should be noted that level detectors without an internal reference source would work equally well when connected to a common external reference source.

As shown in FIG. 1, a calibrating signal may be alternately fed from standard source 24 via selector switch 15, through adjustable resistors 16, 18, 20, 22, and then into level detectors 17, 19, 21, 23. Standard source 24 consists of an adjustable calibrated reference source which is used during initial setup to determine the settings of resistors 16, 18, 20, 22 that establish each thickness deviation limit. When apparatus 10 is used with other types of amplitude variable signals, standard source 24 may be used continuously as an adjustable biasing source by connecting it directly to input terminal 11. In this manner, a variety of fixed values may be established about which amplitude variable signal deviations may be detected.

Still referring to FIG. 1, elapsed time registering apparatus 10 also includes control unit 25 which is fed by time variable operating mode signals 9a, 9b, 9c from input terminals 12, 13, 14, and the time variable deviation signals from level detectors 17, 19, 21, 23. Control unit 25 is divided into functional sections 26, 27, 28, 29, 30 and includes a control power supply not shown. The functional sections consist of interacting combinations of conventional logic devices, such as commercially available relays, circuited by one having ordinary skill in the art to perform the various functions detailed below, much in the same manner as one would connect a series of pipes to different manifolds. Thus, each control unit 25 must be customized for each different installation and for this reason is not available commercially. As applied to rolling mill 1, these devices are circuited to (a) classify individual and combined operating mode signals according to their duration, (b) combine each level detector's output signals and classify them according to duration of each type of deviation under manual and automatic modes of operation, and (c) provide individual time variable output signals to power elapsed time meters 31 through 42. These functions are described more fully below. The logic devices may be circuited in other combinations to meet individual requirements of this or other types of applications.

Control section 26, a totalizing section, provides a continuous signal from an internal source to drive elapsed time meter 31 which, for example, registers the elapsed time of a working shift, day, week, or other period of time. Elapsed time meter 32 is driven during the presence of signal 9a to register the total duration strip S is in the last finishing stand. With signals 9a, 9b, 9c present, elapsed time meter 33 is driven to register the total duration of automatic operating mode when strip S is in the last stand and the deviation signal is valid. However, during the absence of signal 9c, elapsed time meter 34 is driven instead of 33 to register the total duration of manual operating mode under the same conditions.

Control sections 27, 28, 29, 30, thickness deviation sections, are devoted to combining the time variable output signals fed from level detectors 17, 19, 21, 23, and to classifying their duration under automatic operating mode while signals 9a, 9b, 9c are present, or under manual operating mode while signals 9a, 9b are present and 9c is absent. During automatic operating mode, control sections 27, 28, 29, 30 drive only elapsed time meters 35, 37, 39, 41, respectively, and during manual operating mode they drive only elapsed time meters 36, 38, 40, 42, respectively, all as described more fully below.

Control section 27 drives elapsed time meter 35 or 36 during the presence of level detector 17A output signal (negative deviation) to register the duration strip S is maintained within 0 inches to −0.001 inch of its desired thickness.

Control section 28 drives elapsed time meter 37 or 38 during the presence of level detector 19 combined A and B output signals (negative and positive deviation) to register the duration strip S is maintained within 0 inches to +0.001 inch of its desired thickness.

Control sections 27 and 28 are interlocked with each other to disable one while the other is enabled.

Control section 29 drives elapsed time meter 39 or 40 during the presence of level detector 21 combined A and B output signals to register the duration strip S is maintained within +0.002 inch and −0.002 inch of its desired thickness.

Control section 30 drives elapsed time meter 41 or 42 during the presence of level detector 23 combined A and B output signals to register the duration strip S is maintained within +0.004 inch and −0.004 inch of its desired thickness.

Elapsed time meters 31 through 42 are simple, reliable, motor-driven running time meters of the nonreset type having 1/10 minute to 10,000 minute digital registers. Time meters of this description are produced by Industrial Timer Corp., Parsippany, New Jersey, their Model 0C2D. Registers may be calibrated in terms of other units, if desired.

It is to be noted that whenever successive short signal durations are to be registered, the running time meter motor will coast somewhat after being deenergized each time, thereby introducing some error in the registered elapsed time. This may be overcome to a large extent by incorporating the dynamic braking circuitry shown in FIG. 2 in each motor which is subjected to such conditions. Here, a DC biasing voltage is applied to time meter motor M through series connected dropping resistor 43 and diode 44 whenever relay K in control unit 25 does not energize motor M directly from an AC source.

Whenever greater precision in registering elapsed time is required for any of the applications, conventional electronic counters may be substituted for the running time meters noted above.

Returning to FIG. 1, another parameter useful in obtaining performance data on the strip thickness gage is related to the number of strips S that pass through rolls 2 and thickness gage 3, excluding trial runs for setup purposes and the like.

Each time a new strip S enters rolls 2, load cell switch 7 produces signal 9a. When thickness gage 3 detects strip S and determines that the thickness deviation measurement is valid, which in this case signifies the presence of a production strip S, then signal 9b is produced by thickness gage 3. Signal 9a is fed by way of input terminal 12 to counter 45 and control unit 25 also feeds an enabling signal to counter 45 which is based on the presence of signal 9b. Thus, counter 45 registers only the number of production strips S passed through the last-finishing stand of rolling mill 1.

Operation of the preferred embodiment will now be described.

Assume that normal mill operating procedures are fulfilled in their normal manner and a number of identical production strips S are rolled by mill 1 during a given working shift, or turn. Then, as each strip S enters the last finishing stand, thickness gage 3 detects the presence of the strip and continuously sends negative or positive amplitude variable signal 8 to level detectors 17, 19, 21, 23 whenever strip S thickness deviates from a desired value. Signal 8 does not vary at any other time.

Concurrently, time variable signals, or pulses, 9a, 9b, 9c are fed to control unit 25. Load cell switch 7 produces signal 9a from the time each strip S enters rolls 2 until it leaves them. Thickness gage 3 detects the presence of each production strip S being gaged and produces signal 9b only for the duration each said strip is in thickness gage 3. Automatic gage controller 4 produces signal 9c during the time mill 1 is operating under automatic mode and removes signal 9c for the period operating crews take over during the manual operating mode.

As strips S continue to pass through mill 1, control section 26 totalizes the duration of individual and combined operating modes. Time meter 31 registers the duration of shift, or turn, time. Time meter 32 registers the duration strip S is in the last finishing stand. Time meters 33 and 34 register the duration strips S in the last finishing stand and the thickness gage signal is valid under automatic and manual operating modes, respectively. Hence, it is possible for a difference to exist between the elapsed time registered on meter 32 and the sum of elapsed times registered on meters 33 and 34 if thickness gage 3 is inoperative, or if the valid signal 9b is delayed.

Meanwhile, counter 45 registers the number of production strip S passing through mill 1.

In the event that strips S vary in thickness while being rolled under either of the operating modes, level detectors 17, 19, 21, 23 will signal their corresponding control sections 27, 28, 29, 30 of the durations of either their negative or positive deviations as noted above. Elapsed time meters 35 or 36 will register the duration of only production strips S which are maintained within 0 inches to −0.001 inch during either automatic or manual operations, respectively; time meters 37 or 38, within 0 inches to +0.001 inch; time meters 39 or 40, within +0.002 inch to −0.002 inch; and time meters 41 or 42, within +0.004 inch to −0.004 inch.

The following examples illustrate how performance data on rolling mill 1 may be obtained from calculations based on net register readings of elapsed time meters 31 through 42 and counter 45 in apparatus 10:

0001

$$\text{Mill overall utilization factor} = \frac{\text{Meter 32}}{\text{Meter 31}}$$

$$\text{Mill pace, overall (strips/unit time)} = \frac{\text{Counter 45}}{\text{Meter 31}}$$

$$\text{Rolling time per strip} = \frac{\text{Meter 32}}{\text{Counter 45}}$$

$$\text{Percent time on automatic mode} = \frac{\text{Meter 33}}{\text{Meters 33} + 34} \times 100$$

$$\text{Percent time on manual mode} = \frac{\text{Meter 34}}{\text{Meters 33} + 34} \times 100$$

Percent time thickness gage, automatic mode:

$$0'' \text{ to } -.001'' \text{ deviation} = \frac{\text{Meter 35}}{\text{Meter 33}} \times 100$$

$$0'' \text{ to } +.001'' \text{ deviation} = \frac{\text{Meter 37}}{\text{Meter 33}} \times 100$$

$$+.002'' \text{ to } -.002'' \text{ deviation} = \frac{\text{Meter 39}}{\text{Meter 33}} \times 100$$

$$+.004'' \text{ to } -.004'' \text{ deviation} = \frac{\text{Meter 41}}{\text{Meter 33}} \times 100$$

Percent Time Thickness Gage, Manual Mode:

Calculated in the same manner as Automatic Mode, except using meters 36, 38, 40, 42 in place of meters 35, 37, 39, 41.

Although the present invention has been applied to an automated metal strip rolling, it will be readily apparent that it may be applied to other industrial processes and control systems to obtain long term performance data in a similar manner.

We claim:

1. Elapsed time registering apparatus comprising:
   a. input means for receiving signals from process apparatus or the like, said signals consisting of
      .1. an amplitude variable process signal, and
      .2. a number of related time variable operating mode signals;
   b. detecting means for detecting the deviation of the process signal from a number of specific limits, said means producing separate time variable signals for the duration the process signal is maintained within each specified limit;
   c. control means responsive to each type of time variable signal for classifying each level of process signal according to duration under one or more operating modes, and for further classifying individual and combined operating mode signals according to their duration, if desired; and
   d. means for registering the elapsed time of each time variable signal and combination thereof produced by the control means, said means further registering continuous elapsed time, if desired.

2. The apparatus of claim 1 further including
   e. means operable alternately with the amplitude variable signal input means for applying a calibrating signal to the detecting means to calibrate each of said specified limits.

3. The apparatus of claim 1 further including
   f. means operable continuously with the amplitude variable signal input means for applying a biasing signal to the input signal, thereby establishing a value about which amplitude variable signal deviations may be detected.

4. The apparatus of claim 1 further including
   g. counting means responsive to said operating signals for registering the number of apparatus operations during a period when the process variable signal is valid, thereby enabling a comparison of the operations register with an elapsed time register.

5. The apparatus of claim 1 wherein said means (d) consists of separate motor driven elapsed time meters, each operable under control of a given control means signal.

6. The apparatus of claim 5 further including:
   h. circuit means for applying dynamic braking to one or more of said time meter motors.

7. A method of registering the elapsed time of process apparatus signals to obtain performance data on the operations of said apparatus, said method comprising:
   a. monitoring
      .1. an amplitude variable process signal and
      .2. a number of related time variable operating mode signals;
   b. detecting the deviation of the process signal from a number of specified process limits and issuing separate time variable signals for the duration the process signal is maintained within each specified limit;
   c. classifying
      .1. each level of process signal deviation according to duration under one or more operating modes; and if desired,
      .2. individual and combined operating mode signals according to their duration;
   d. registering the elapsed time of each classified signal and combination thereof.

8. The method of claim 7 further including the step
   e. comparing the elapsed times registered to a predetermined operating standard.

9. The method of claim 8 further including the step
   f. counting apparatus operations responsive to a respective time variable signal and registering said count, and wherein step (g) consists of comparing said count registered together with at least one elapsed time registered to a predetermined operating standard.